US008673472B2

(12) United States Patent
Cicero et al.

(10) Patent No.: US 8,673,472 B2
(45) Date of Patent: Mar. 18, 2014

(54) LOW PROFILE BATTERY PACK

(75) Inventors: Marke S. Cicero, Ortonville, MI (US);
Mike A. Marchio, Clarkston, MI (US);
Frank A. Valdez, Clarkston, MI (US)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 13/345,153

(22) Filed: Jan. 6, 2012

(65) Prior Publication Data

US 2012/0177971 A1 Jul. 12, 2012

Related U.S. Application Data

(60) Provisional application No. 61/430,821, filed on Jan. 7, 2011.

(51) Int. Cl.
*H01M 2/10* (2006.01)
*H01M 6/42* (2006.01)

(52) U.S. Cl.
USPC .............. 429/100; 429/96; 429/156; 429/159

(58) Field of Classification Search
None
See application file for complete search history.

(56) References Cited

U.S. PATENT DOCUMENTS

| 3,988,170 A | 10/1976 | Koch et al. |
| 2003/0039881 A1 | 2/2003 | Mount |
| 2006/0289224 A1 | 12/2006 | Ono et al. |
| 2007/0141459 A1 | 6/2007 | Goto et al. |
| 2008/0026284 A1 | 1/2008 | Fujii |
| 2009/0191452 A1 | 7/2009 | Anantharaman et al. |
| 2010/0000816 A1* | 1/2010 | Okada .................. 180/68.5 |
| 2011/0076521 A1* | 3/2011 | Shimizu et al. .......... 429/7 |
| 2011/0262797 A1* | 10/2011 | Kim ...................... 429/149 |

FOREIGN PATENT DOCUMENTS

| EP | 1091438 | 4/2001 |
| WO | WO 2010/136861 | 12/2010 |

OTHER PUBLICATIONS

U.S. Appl. No. 13/344,713, filed Jan. 6, 2012, Marchio et al.
Taniguchi et al: "Development of nickel/metal-hydride batters for EVs and HEVs"; Journal of Power Sources, Elsevier SA, CH, vol. 100 No. 1-2; Nov. 30, 2001; pp. 117-124.
Written Opinion of the International Searching Authority, for International Application No. PCT/US2012/020489, mailed Jul. 6, 2012.

* cited by examiner

*Primary Examiner* — Cynthia K. Walls
(74) *Attorney, Agent, or Firm* — Maginot, Moore & Beck

(57) ABSTRACT

A battery pack according to the present disclosure includes a first module array, a second module array, and a center channel. The first module array includes a first frame and a first cassette of battery modules disposed within the first frame. The first cassette of battery modules includes a first plurality of prismatic cells and a first plurality of module terminals. The second module array includes a second frame and a second cassette of battery modules disposed within the second frame. The second cassette of battery modules includes a second plurality of prismatic cells and a second plurality of module terminals. The center channel extends through a center of the battery pack and connects the first module array to the second module array. The first plurality of module terminals and the second plurality of module terminals are disposed adjacent to the center channel on opposite sides of the center channel.

20 Claims, 10 Drawing Sheets

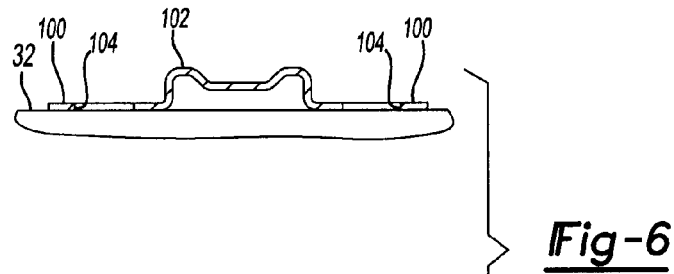
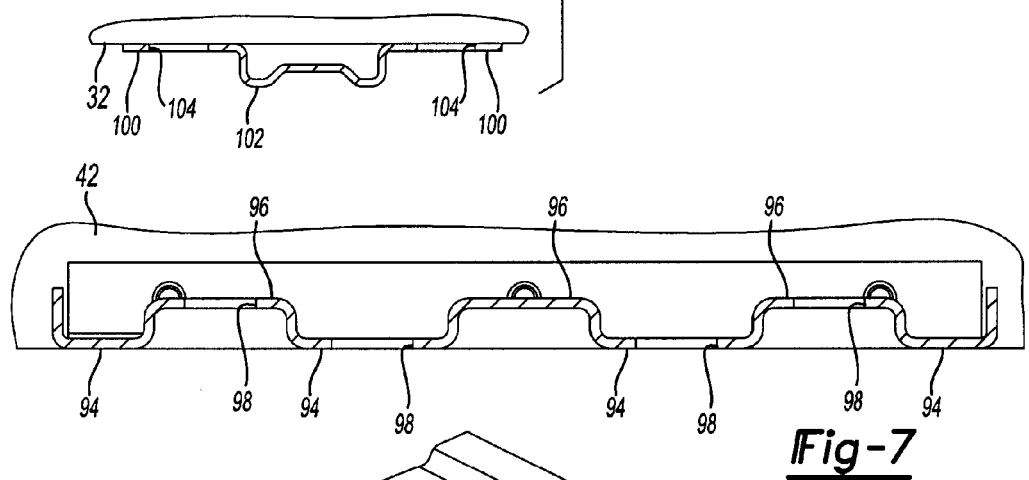
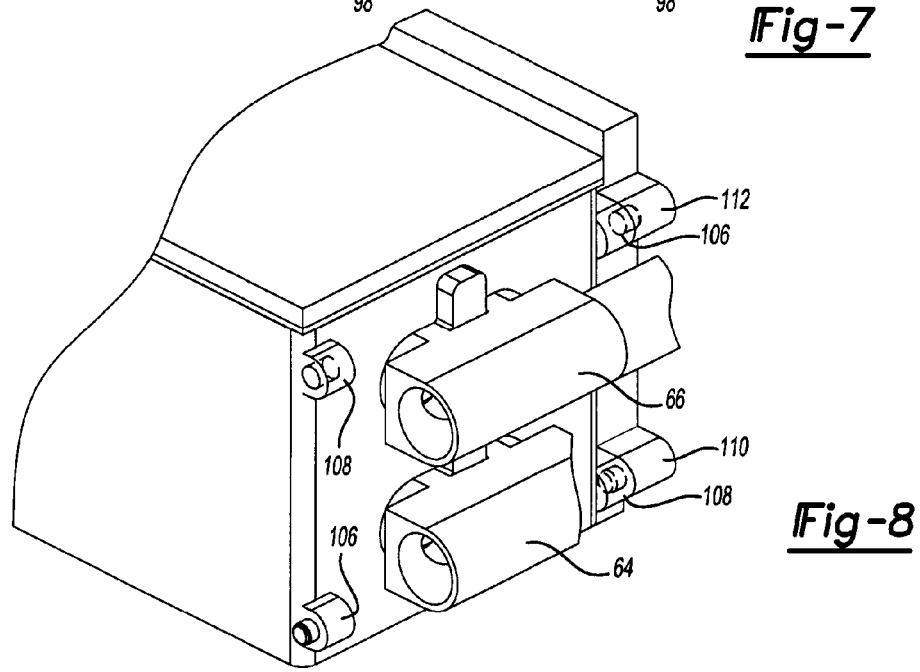

LOW PROFILE BATTERY PACK

CROSS-REFERENCE TO RELATED APPLICATIONS

This application claims the benefit of U.S. Provisional Application No. 61/430,821, filed on Jan. 7, 2011. This application is related to U.S. Provisional Application No. 61/431,132, filed on Jan. 7, 2011, and U.S. application Ser. No. 13/344,713, filed on Jan. 6, 2012 and claiming the benefit of U.S. Provisional Application No. 61/431,132. The disclosures of the above applications are incorporated herein by reference in their entirety.

FIELD

The present disclosure relates to battery packs for vehicles and more particularly to battery pack systems for prismatic cells.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electric vehicles (EVs), hybrid electric vehicles (HEVs) and plug-in HEVs use multiple propulsion systems to provide motive power. The propulsion systems may include electric or battery powered systems that receive power from one or more battery packs. A battery pack may include one or more battery modules, and a battery module may include one or more banks of high-voltage cells (or batteries), such as lithium ion cells.

The operating temperature of a cell can affect the lifespan and performance (e.g., charging and discharging characteristics) of the cell. Regulating the operating temperature of a cell within a predetermined operating temperature range may maximize lifespan and performance of the cell.

Within a battery pack, however, the operating temperatures of the cells may vary from cell to cell. Temperature variations can arise between the cells of a battery pack for various reasons. For example only, temperature variations can be caused by manufacturing differences between the cells, differences in locations of the cells within the battery pack, thermal path differences of each cell, and other reasons. It can be difficult to maintain each of the cells of a battery pack within the predetermined operating temperature range.

In addition, the cells within a battery pack may not be packaged as efficiently as possible. As a result, the overall height, mass, and cost of the battery pack may be greater than necessary. Furthermore, high voltage connections within a battery pack may be disposed at various locations within the battery pack. The length of wires routed to the high voltage connections and the number of protective coverings for the high voltage connections may further increase the mass and cost of the battery pack.

SUMMARY

A battery pack according to the principles of the present disclosure includes a first module array, a second module array, and a center channel. The first module array includes a first frame and a first cassette of battery modules disposed within the first frame. The first cassette of battery modules includes a first plurality of prismatic cells and a first plurality of module terminals. The second module array includes a second frame and a second cassette of battery modules disposed within the second frame. The second cassette of battery modules includes a second plurality of prismatic cells and a second plurality of module terminals. The center channel extends through a center of the battery pack and connects the first module array to the second module array. The first plurality of module terminals and the second plurality of module terminals are disposed adjacent to the center channel on opposite sides of the center channel.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a section view of the inner frame taken along the line 6-6 shown in FIG. 5;

FIG. 7 is a section view of the inner frame taken along the line 7-7 shown in FIG. 5;

FIG. 8 is a perspective view of a portion of the first example battery pack illustrating a connection between a battery module and an end plate;

DETAILED DESCRIPTION

Figure 1:
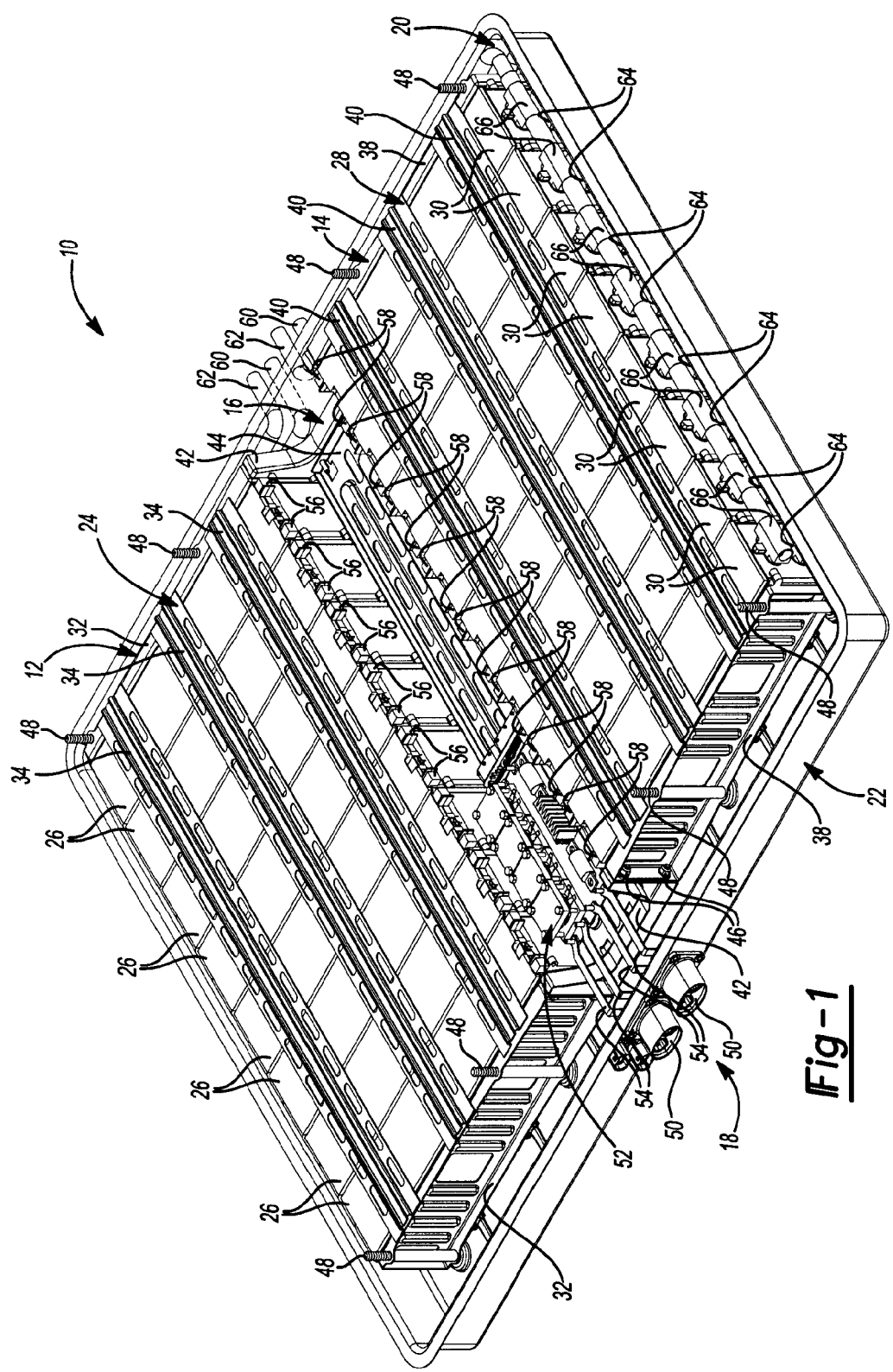
FIG. 1 is a perspective view of a first example battery pack according to the principles of the present disclosure, with a top cover of the first battery pack removed.

A battery pack may include one or more module arrays, a power circuit, and an outer enclosure. A module array may include one or more battery modules and an inner structure that captures the battery modules. The power circuit may include main terminals extending through the outer enclosure, a battery pack control module (BPCM), and wires connecting the main terminal and the BPCM. The BPCM may control power supplied to and from the battery modules. The module arrays and the BPCM may be disposed within and/or fixed to the outer enclosure. The outer enclosure may electrically isolate and protect components disposed within the outer enclosure.

Typically, the outer enclosure provides a framework for the battery pack. For example, the battery modules may be mounted to the outer enclosure at various locations, and the outer enclosure may be mounted to a vehicle body. Thus, the outer enclosure may be made from a high mass material such as steel. In addition, features for mounting the battery modules to the outer enclosure and for mounting the outer enclosure to the vehicle body may increase the overall height of the battery pack.

Also, a battery pack typically includes a wiring harness that wraps around the outside perimeter of the battery pack. The wiring harness may be connected to the battery modules to supply power to the cells disposed within the modules. Increasing the length of the wiring harness increases the cost and mass of the battery pack. Additionally, the connections between the wiring harness and the battery modules may be high voltage connections disposed at various locations within the battery pack. Each high voltage connection may be electrically isolated using protective covers. Increasing the number of protective covers also increases the cost and mass of the battery pack.

A battery pack according to the principles of the present disclosure includes a first module array, a second module array, a center channel, a power circuit, and an outer enclosure. The first module array and the second module array each include a cassette of battery modules and an inner frame capturing the cassette. The center channel extends through the center of the battery pack and connects the first module array and the second module array. The power circuit supplies power to cells disposed within the battery modules. Fasteners extend through the inner frames of the module arrays and through the outer enclosure to fix the battery pack to a vehicle body.

The outer enclosure electrically isolates and protects components disposed within the outer enclosure. However, the outer enclosure is not required to serve as a framework for the battery pack for at least three reasons. First, the module arrays are fixed directly to the vehicle body rather than indirectly fixing the module arrays to the vehicle body via the outer enclosure. Second, the module arrays are connected to one another via the center channel instead of the outer enclosure. Third, the inner frames of the module arrays include features such as ribs for increased rigidity.

Since the outer enclosure does not serve as a framework for the battery pack, the outer enclosure may be made from a lower mass material such as plastic or carbon fiber. Thus, the cost and mass of the battery pack may be reduced. In addition, since the mounting features for the module arrays and the outer enclosure are integrated, the overall height of the battery pack may be reduced. For example, the overall height of the battery pack may be less than or equal to 140 millimeters (mm). Thus, the battery pack may have a low profile that enables placement of the battery pack underneath a vehicle underbody while maximizing cargo space and/or vehicle ground clearance.

The power circuit in a battery pack according to the principles of the present disclosure includes main terminals, a battery pack control module (BPCM), and wires connecting the main terminals and the BPCM. The battery modules include module terminals, and the BPCM is connected to the module terminals to supply power to cells disposed within the battery modules. The power circuit is disposed along the center channel and the module terminals are disposed on opposite sides of the center channel. Thus, the length of wires within the battery pack may be reduced relative to the length of a wiring harness that extends around the outside perimeter of a battery pack. Also, high voltage connections may be confined to the center channel, and therefore the number of protective covers may be reduced. Reducing wiring length and the number of protective covers reduces the cost and mass of the battery pack.

Referring now to FIGS. 1 through 4, a battery pack 10 according to the principles of the present disclosure includes a first module array 12, a second module array 14, a center channel 16, a power circuit 18, a liquid cooling system 20, and an outer enclosure 22. The first module array 12 includes a first frame 24 and first battery modules 26 disposed within the first frame 24. The second module array 14 includes a second frame 28 and second battery modules 30 disposed within the second frame 28. The first battery modules 26 may be linked together to form a first cassette and the second battery modules 30 may be linked together to form a second cassette. Although the module arrays 12, 14 are each shown as including eight battery modules, the module arrays 12, 14 may include more or less battery modules. Each of the battery modules 26, 30 may include a plurality of prismatic cells.

The first frame 24 includes first end plates 32 and first bands 34. The first end plates 32 are disposed at opposite longitudinal ends of the first module array 12. The first bands 34 extend laterally across the battery pack 10 and connect the first end plates 32 to one another. The first bands 34 are disposed above and below the first battery modules 26. The first battery modules 26 are captured between the first end plates 32 and between the first bands 34.

The second frame 28 includes second end plates 38 and second bands 40. The second end plates 38 are disposed at opposite longitudinal ends of the second module array 14. The second bands 40 extend laterally across the battery pack 10 and connect the second end plates 38 to one another. The second bands 40 are disposed above and below the second battery modules 30. The second battery modules 30 are captured between the second end plates 38 and between the second bands 40.

The center channel 16 extends laterally across the battery pack 10 through the center of the battery pack 10. The center channel 16 connects the first module array 12 and the second module array 14 to one another. The center channel 16 includes end members 42 and a cross member 44 that extends laterally across the battery pack 10 and connects the end members 42 to one another.

Fasteners 46 connect the end members 42 of the center channel 16 to the end plates 32, 38 of the module arrays 12, 14. Screws 48 extend through the outer enclosure 22 and through the end plates 32, 38 of the module arrays 12, 14. The screws 48 fix the outer enclosure 22 to the module arrays 12, 14. In addition, the screws 48 are configured to fix the battery pack 10 to a vehicle body (not shown).

The power circuit 18 is disposed along the center channel 16 and supplies power to and from the battery modules 26, 30. The power circuit 18 includes main terminals 50, a battery pack control module (BPCM) 52, and conduits 54 that connect the main terminals 50 to the BPCM 52. The main terminals 50 extend through the outer enclosure 22 and may be mounted to the outer enclosure 22 using fasteners. The BPCM 52 controls the power supplied to and from the battery modules 26, 30. The BPCM 52 may be mounted to the center channel 16 using, for example, fasteners (not shown).

The first battery modules 26 include first module terminals 56 and the second battery modules 30 include second module terminals 58. The module terminals 56, 58 are disposed adjacent to the center channel 16 and on opposite sides of the center channel 16. Wires (not shown) may connect the BPCM 52 to the module terminals 56, 58. Placing the power circuit 18 along the center channel 16 and placing the module terminals 56, 58 on opposite sides of the center channel 16 minimizes wire lengths in the battery pack 10.

The module arrays 12, 14, the center channel 16, and the power circuit 18 are disposed within the outer enclosure 22. The outer enclosure 22 electrically isolates and protects components disposed therein. As discussed below, the center channel 16, the first frame 24 of the first module array 12, and the second frame 28 of the second module array 14 may be joined together to form an inner frame of the battery pack 10. In addition, the inner frame may be fixed directly to the vehicle body rather than fixing the inner frame to the vehicle body via the outer enclosure 22. Thus, the inner frame may be formed from a high mass material such as steel, and the outer enclosure 22 may be formed from a low mass material such as plastic and/or carbon fiber.

The liquid cooling system 20 cools cells disposed within the battery pack 10 by circulating coolant through cooling members that are disposed adjacent to the cells. The liquid cooling system 20 includes coolant supply lines 60, coolant return lines 62, coolant inlets 64, and coolant outlets 66. Coolant may be supplied to the coolant inlets 64 via the coolant supply lines 60, circulated in cooling members extending through the battery modules 26, 30, and returned from the coolant outlets 66 via the coolant return lines 62. Examples of the battery modules 26, 30 and the cooling members extending through the battery modules 26, 30 are provided in U.S. application Ser. No. 13/344,713.

Figure 2:
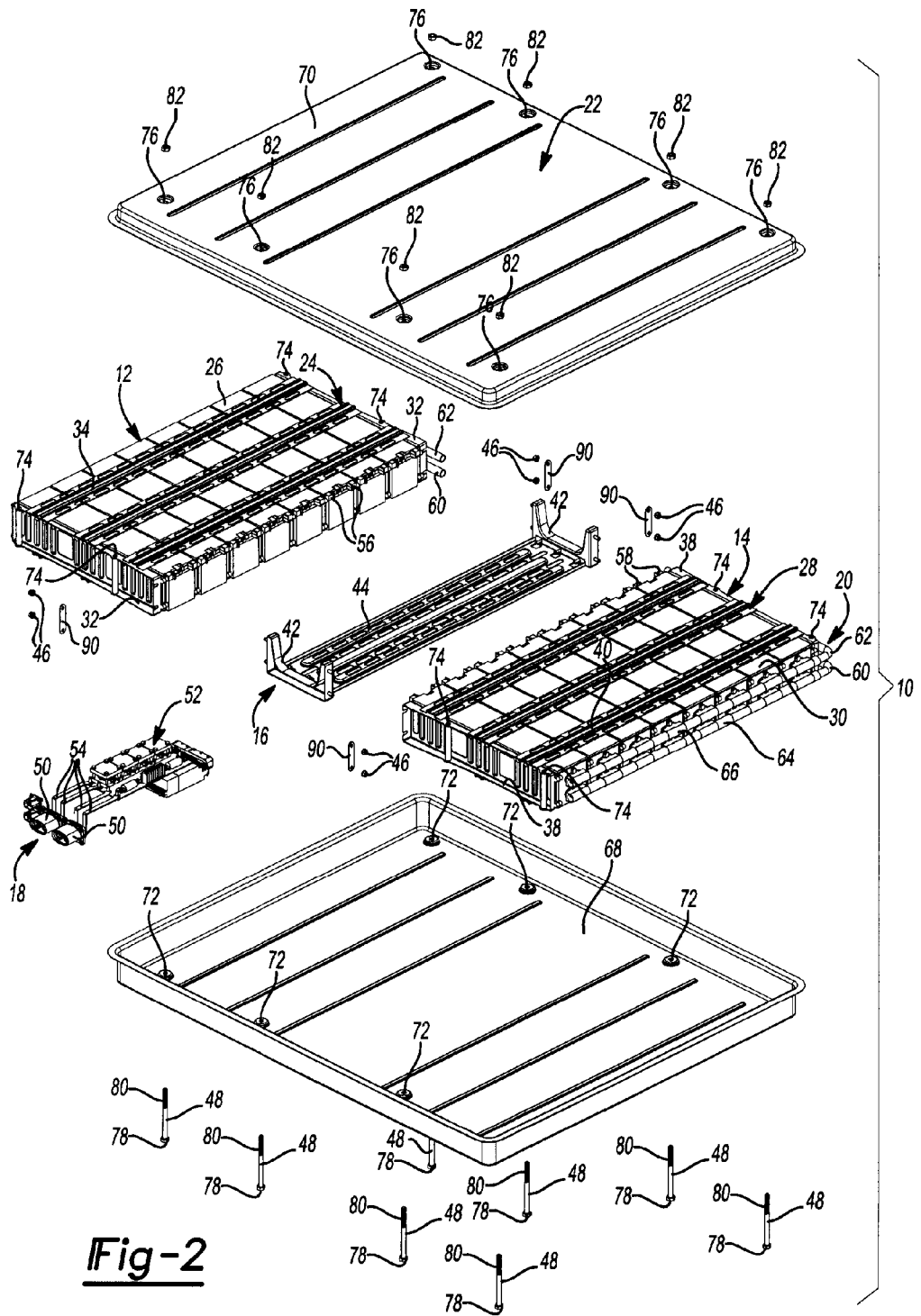
FIG. 2 is an exploded perspective view of the first example battery pack.
Figure 3:
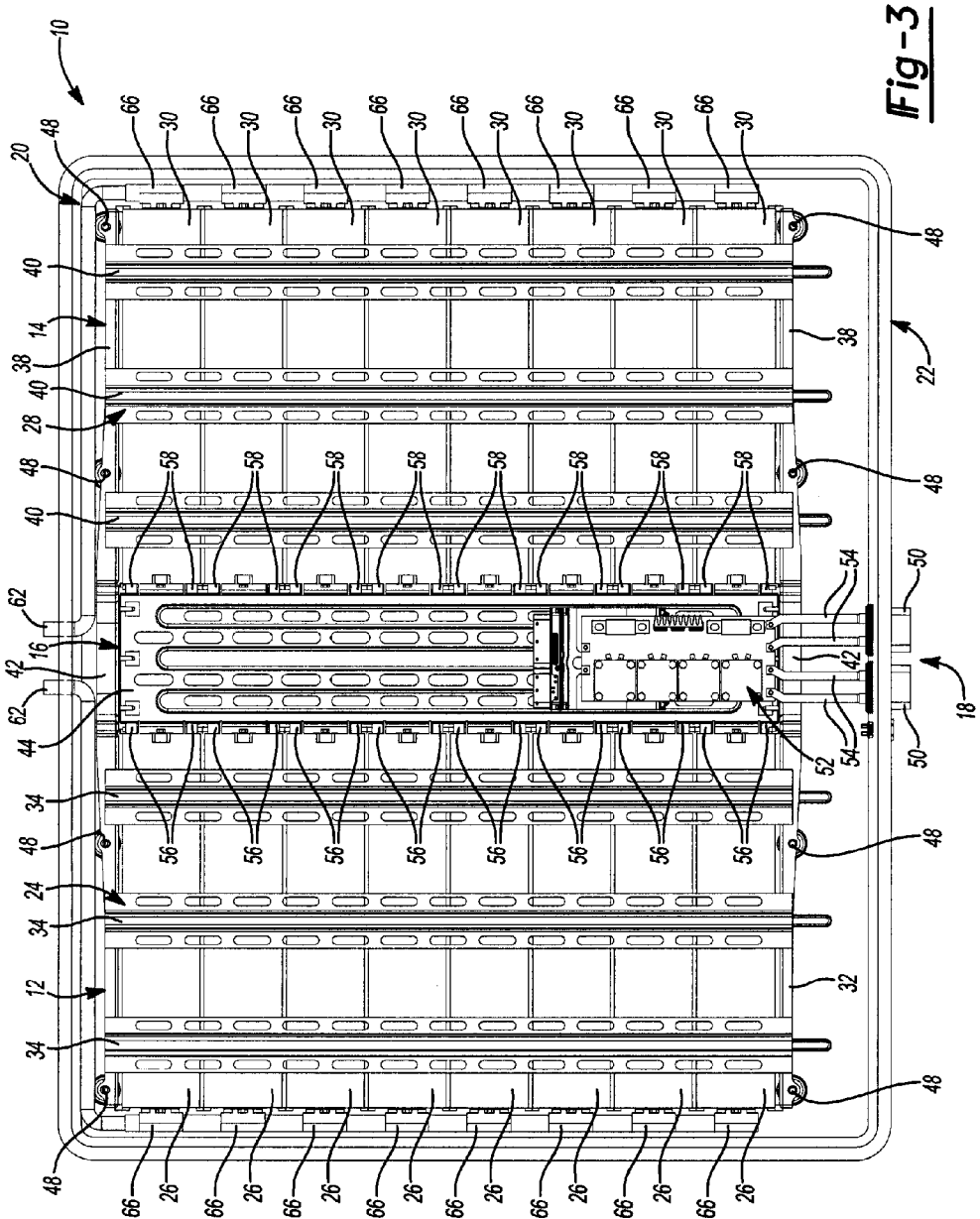
FIG. 3 is a top view of the first example battery pack, with the top cover of the first example battery pack removed.

With particular reference to FIG. 2, the outer enclosure 22 includes a lower enclosure 68 and an upper enclosure 70. The screws 48 extend through counterbores 72 in the lower enclosure 68, through apertures 74 in the end plates 32, 38, and through counterbores 76 in the upper enclosure 70. The counterbores 72 in the lower enclosure 68 accommodate heads 78 of the screws 48 so that the screws 48 do not extend beyond the bottom surface of the lower enclosure 68. The counterbores 76 in the upper enclosure accommodate nuts 82 assembled to threaded ends 80 of the screw 48 so that the nuts 82 do not extend beyond the upper surface of the upper enclosure 70.

The screws 48 are shown inserted in an upward direction through the battery pack 10. Thus, the screws 48 may be configured to fix the battery pack 10 to a bottom surface of the vehicle body. Alternatively, the screws 48 may be inserted in a downward direction through the battery pack 10. Thus, the screws 48 may be configured to fix the battery pack 10 to a top surface of the vehicle body.

Figure 4:
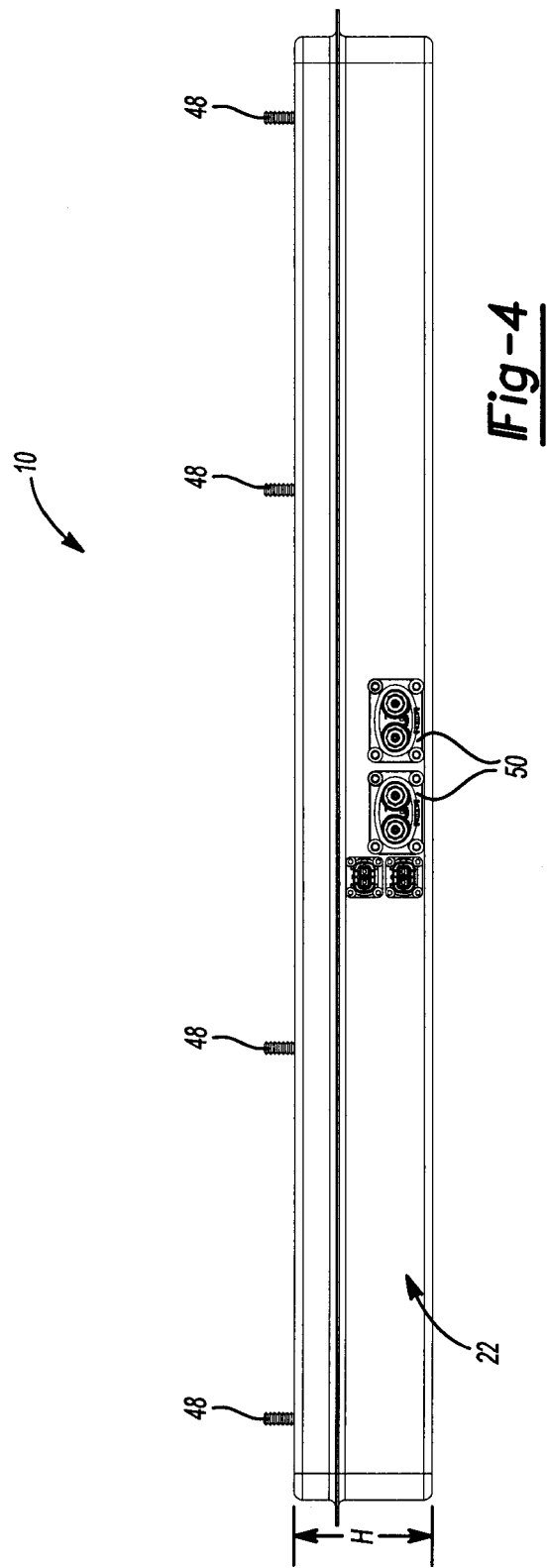
FIG. 4 is a side view of the first example battery pack.

With particular reference to FIG. 4, integrating mounting features within the battery pack 10 allows a height H of the battery pack 10 to be minimized. As discussed above, features for mounting the outer enclosure 22 to the module arrays 12, 14 are integrated with features for mounting the battery pack 10 to the vehicle body. In turn, the height H of the battery pack 10 may be less than or equal to 140 millimeters (mm).

Figure 5:
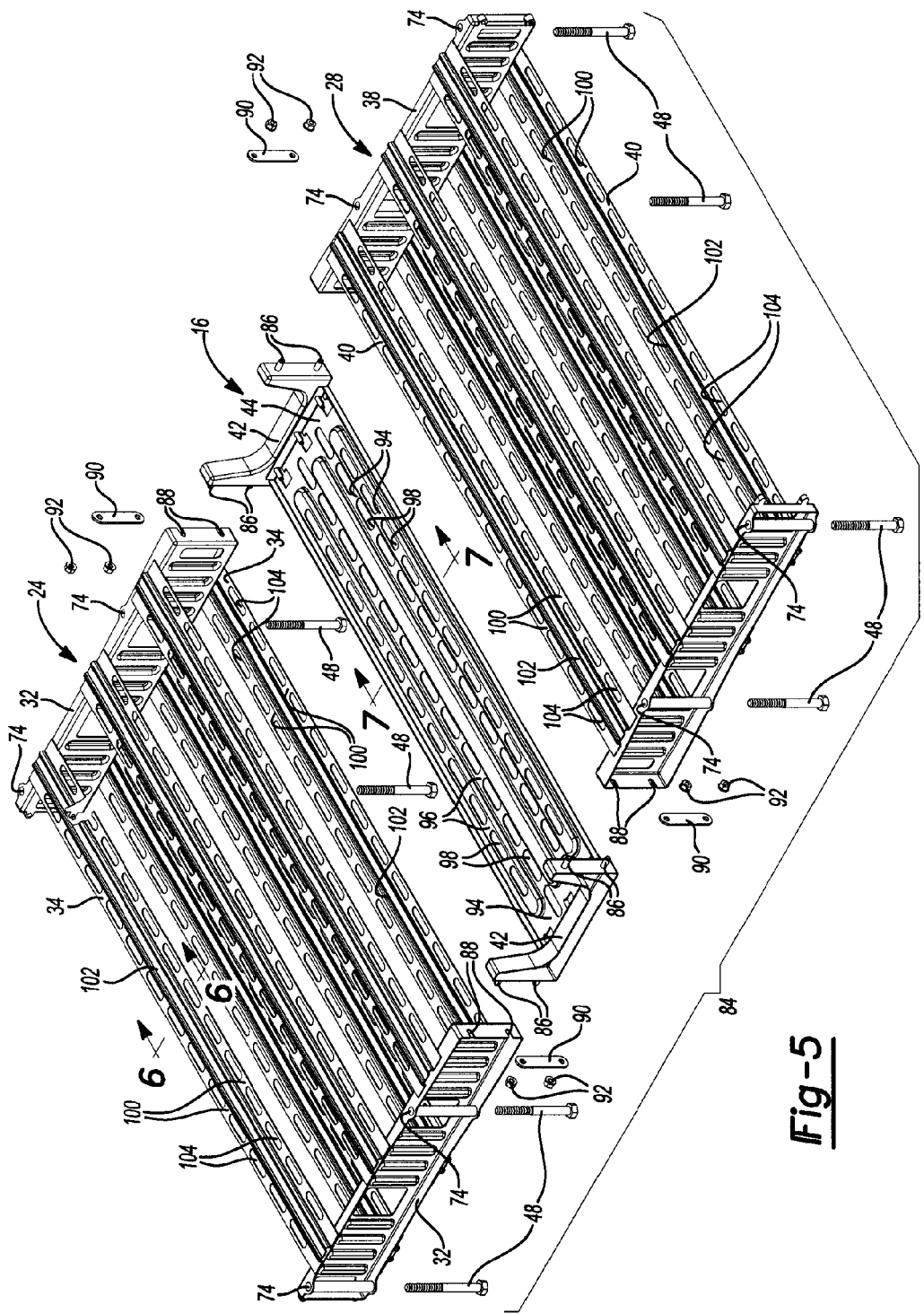
FIG. 5 is an exploded perspective view of an inner frame of the first example battery pack.

Referring now to FIG. 5, the center channel 16, the first frame 24 of the first module array 12, and the second frame 28 of the second module array 14 are fastened together to form an inner frame 84 of the battery pack 10. The end members 42 of the center channel 16 include studs 86 that extend through slots 88 in the end plates 32, 38. Washers 90 are placed on the studs 86 and nuts 92 are threaded onto the studs 86 to fasten the first frame 24 and the second frame 28 to the center channel 16.

With additional reference to FIGS. 6 and 7, the inner frame 84 includes various features that reduce the mass of the battery pack 10 while maintaining the structural integrity of the battery pack 10. The cross member 44 of the center channel 16 includes generally flat portions 94 and elongated ridges or ribs 96 that are raised relative to the flat portions 94. The ribs 96 increase the rigidity of the center channel 16. The flat portions 94 and the ribs 96 define apertures 98 that reduce the mass of the center channel 16. In addition, the BPCM 52 may be mounted to the center channel 16 using the apertures 98.

The bands 34, 40 of the frames 24, 28 include generally flat portions 100 and elongated ridges or ribs 102 that extend vertically from the flat portions 100. The ribs 102 increase the rigidity of the frames 24, 28. The flat portions 100 define apertures 104 that reduce the mass of the frames 24, 28.

Referring now to FIG. 8, the battery modules 26, 30 may include male connecting members 106 and female connecting members 108. The battery modules 26, 30 may be linked together by inserting the male connecting members 106 into the female connecting members 108. In addition, the end plates 32, 38 may include male connecting members 110 and female connecting members 112. The battery modules 26, 30 disposed at the lateral ends of the module arrays 12, 14 may be linked to the end plates 32, 28 by coupling the connecting members 106, 108 on the battery modules 26, 30 to the connecting members 110, 112 on the end plates 32, 38.

Figure 9:
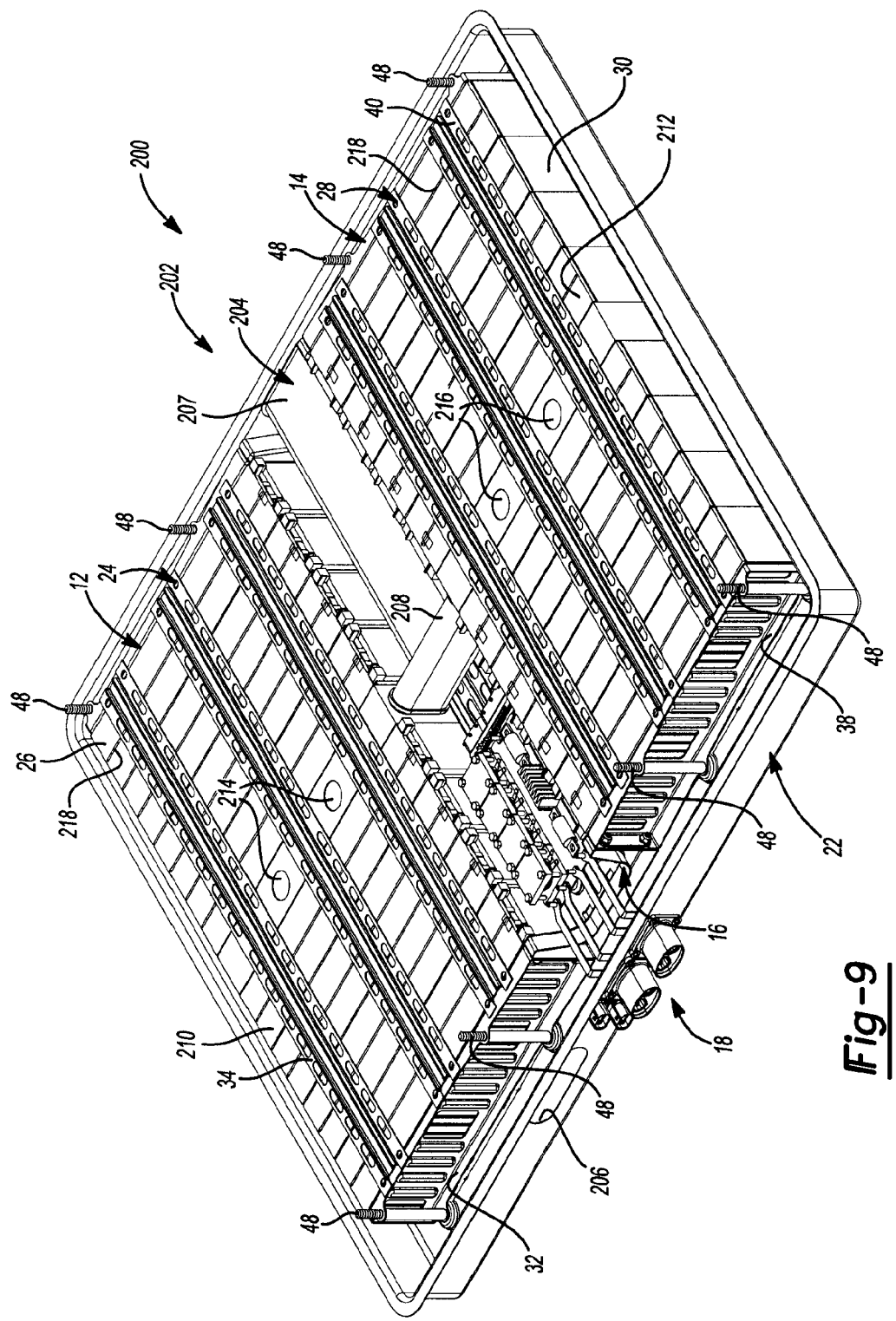
FIG. 9 is a perspective view of a second example battery pack according to the principles of the present disclosure, with a top cover of the second example battery pack removed.
Figure 10:
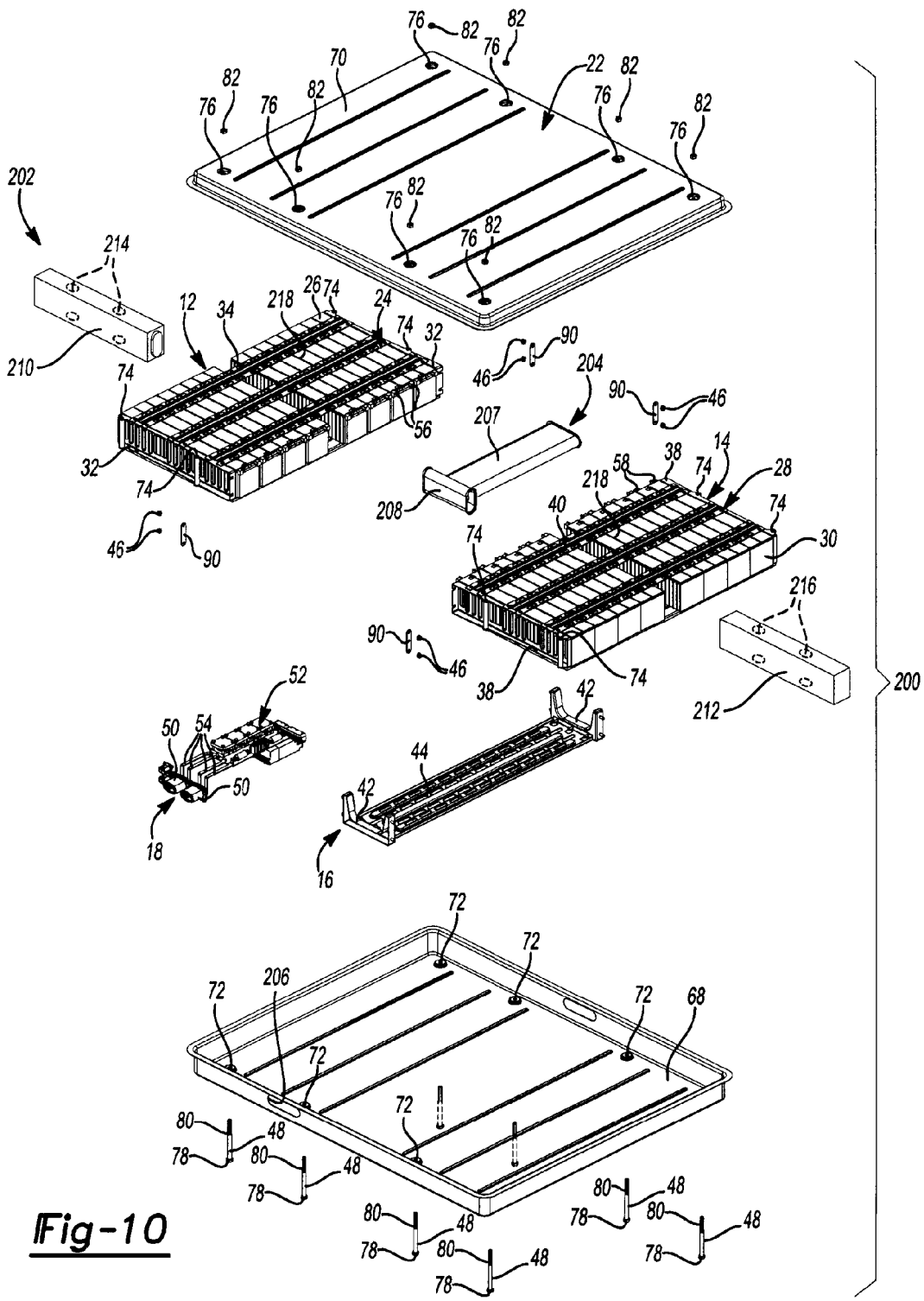
FIG. 10 is an exploded perspective view of the second example battery pack.
Figure 11:
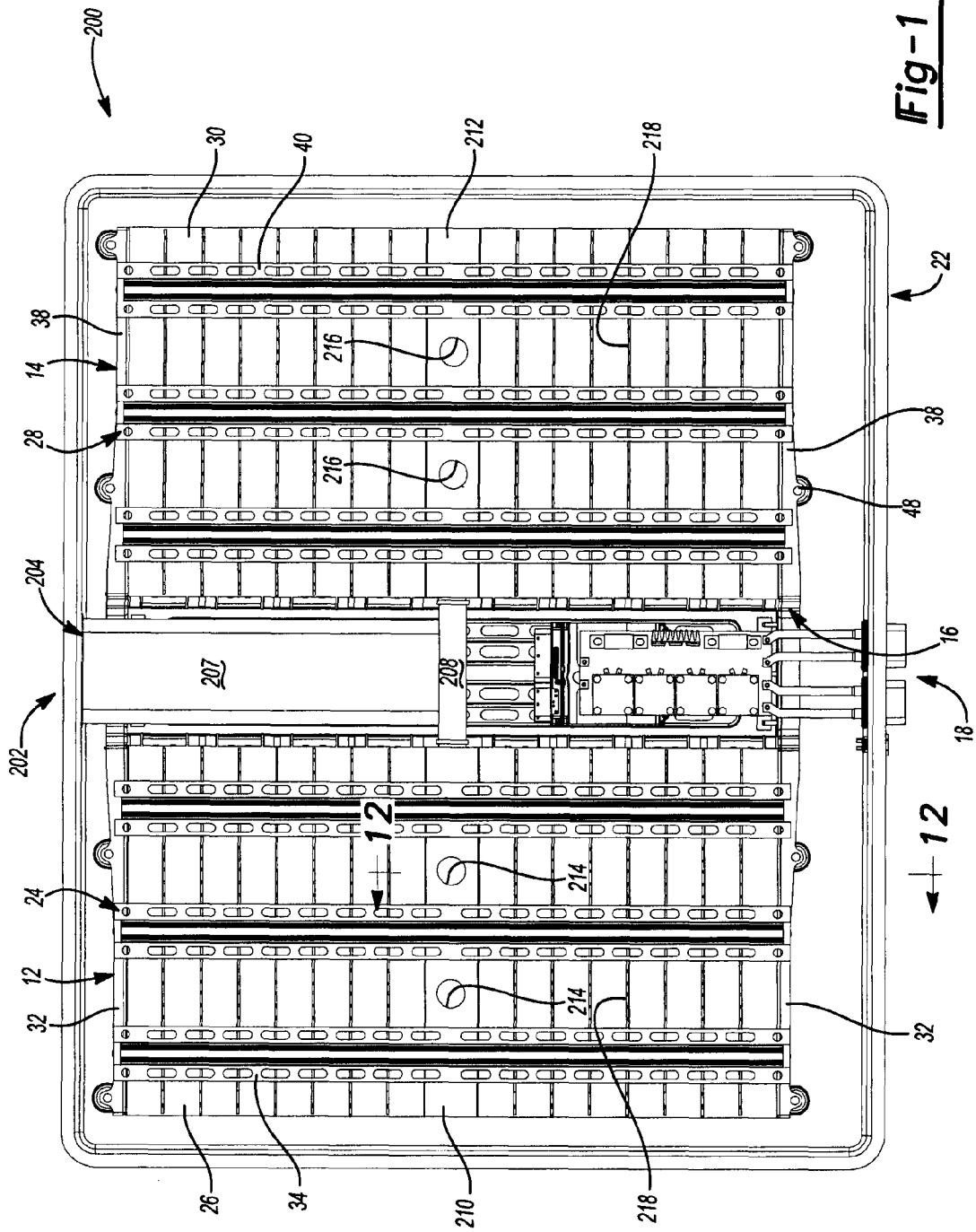
FIG. 11 is a top view of the second example battery pack.

Referring now to FIGS. 9 through 11, a battery pack 200 is similar to the battery pack 10 except that the battery pack 200 includes an air cooling system 202 in place of the liquid cooling system 20. The air cooling system 202 includes an air plenum 204 and an air outlet 206. The air plenum 204 extends through the outer enclosure 22 and delivers air to the interior of the battery pack 200 to cool cells disposed within the battery pack 200. The air outlet 206 extends through the outer enclosure 22 and allows air to exit the battery pack 200. A fan or blower (not shown) may pump air through the air plenum, and a duct (not shown) may be connected to the air outlet 206 to return air to the fan or blower.

The air plenum 204 includes a first duct 207, a second duct 208, a first manifold 210, and a second manifold 212. The first duct 207 extends laterally across the battery pack 200 along the center channel 16 from the outer enclosure 22 to the second duct 208. The second duct 208 extends from the first duct 207 to the first manifold 210 and the second manifold 212.

The first manifold 210 extends longitudinally across the battery pack 200 between the first battery modules 26 and defines first apertures 214 that extend through the first manifold 210. The second manifold 212 extends longitudinally across the battery pack 200 between the second battery modules 30 and defines second apertures 216 that extend through the second manifold 212. The battery modules 26, 30 may include caps (not shown) that may be removed to reveal slots 218 extending longitudinally through the battery modules 26, 30.

Figure 12:
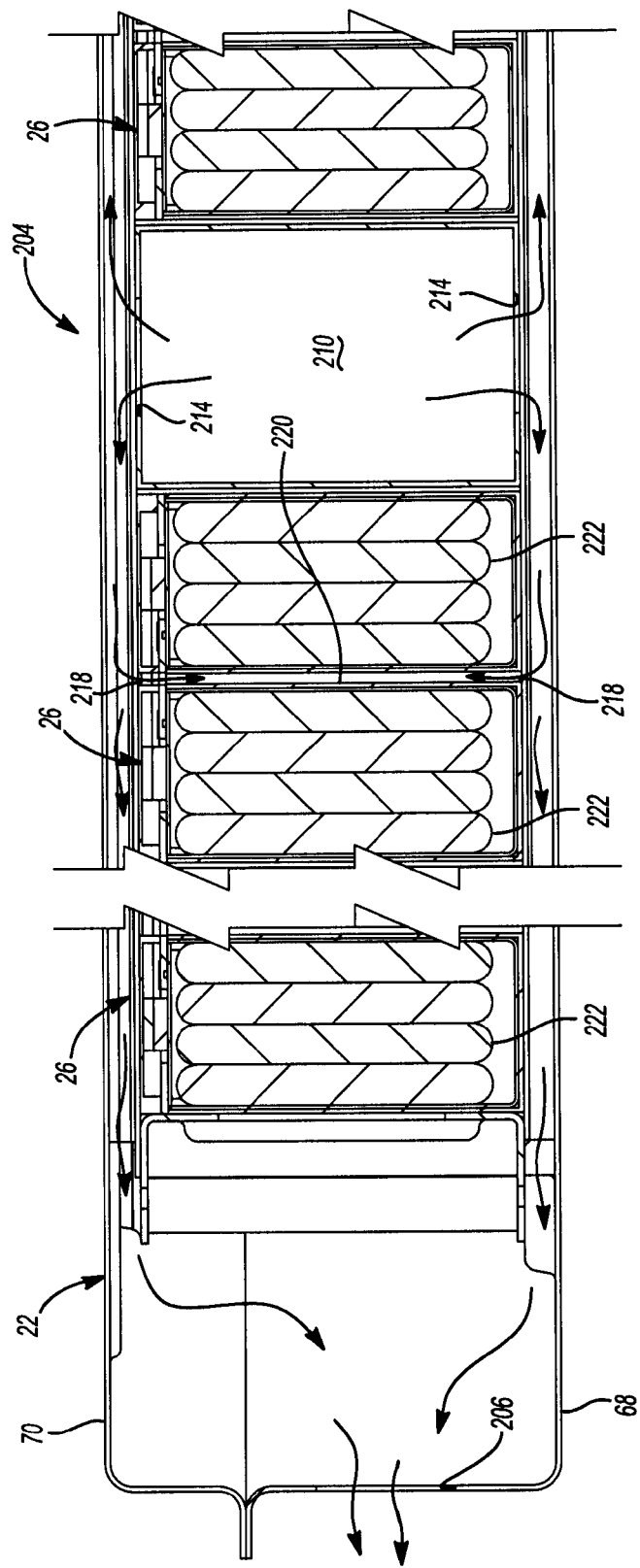
FIG. 12 is a section view of the second example battery pack taken along the line 12-12 shown in FIG. 11.

Referring now to FIG. 12, airflow from the air plenum 204 to the air outlet 206 is illustrated. Air exits the air plenum 204 through the first apertures 214 in the first manifold 210 and flows between the first battery modules 26 and the outer enclosure 22 in opposite lateral directions across the battery pack 200. Air flows laterally across the battery pack 200 between the top surfaces of the first battery modules 26 and the upper enclosure 70 and between the bottom surfaces of the first battery modules 26 and the lower enclosure 68. Air flows vertically between the first battery modules 26. In addition, the slots 218 allow air to enter a cooling chamber 220 disposed between banks of cells 222 disposed in the first battery modules 26. Thus, air flows on both sides of the cells 222 to maintain the cells 222 at a predetermined operating temperature. Air may flow through the second battery modules 30 in a similar manner.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A battery pack comprising:
a first module array that includes a first frame and a first cassette of battery modules disposed within the first frame, the first cassette of battery modules including a first plurality of prismatic cells and a first plurality of module terminals;
a second module array that includes a second frame and a second cassette of battery modules disposed within the second frame, the second cassette of battery modules including a second plurality of prismatic cells and a second plurality of module terminals;
a center channel that extends through a center of the battery pack and that connects the first module array to the second module array, wherein the first plurality of module terminals and the second plurality of module terminals are disposed adjacent to the center channel and on opposite sides of the center channel;
a power circuit that is disposed along the center channel, the power circuit providing power to and from the first plurality of module terminals and the second plurality of module terminals; and
an outer enclosure that encloses the first module array, the second module array, the center channel, and the power circuit.

2. The battery pack of claim 1 wherein a height of the battery pack is less than or equal to 140 millimeters.

3. The battery pack of claim 1 wherein the outer enclosure is formed from a non-conductive material.

4. The battery pack of claim 3 wherein the non-conductive material includes at least one of plastic and carbon fiber.

5. The battery pack of claim 1 wherein the first frame and the second frame each include end plates and a respective plurality of bands extending between and connecting the end plates.

6. The battery pack of claim 5 further comprising a plurality of fasteners configured to fix the battery pack to a vehicle, the fasteners extending through the end plates and the outer enclosure.

7. The battery pack of claim 5 wherein the pluralities of bands include a ridge disposed between generally flat portions.

8. The battery pack of claim 5 wherein the battery modules are captured between the bands and the end plates.

9. The battery pack of claim 5 wherein the end plates include connecting members that retain those of the plurality of modules disposed adjacent to the end plates.

10. The battery pack of claim 5 further comprising a liquid cooling system that includes a coolant supply line, a coolant return line, and a plurality of cooling members in fluid communication with the coolant supply line and the coolant return line and extending longitudinally into the battery modules.

11. The battery pack of claim 5 further comprising an air cooling system that includes an air plenum extending laterally along the center channel and extending longitudinally approximately midway through the first cassette of battery modules and approximately midway through the second cassette of battery modules.

12. The battery pack of claim 11 wherein the air plenum defines a plurality of air inlets that allow air to flow from the air plenum, between the battery modules and the outer enclosure, and to an air outlet extending through the outer enclosure.

13. A battery pack, comprising:
an outer enclosure defining first apertures that extend through the outer enclosure;
an inner frame that is disposed within the outer enclosure, the inner frame including end plates and bands extending between and connecting the end plates, the end plates defining second apertures that extend through the end plates and that are aligned with the first apertures in the outer enclosure;
fasteners extending through the first apertures in the outer enclosure and through the second apertures in the end plates for attaching the battery pack to a vehicle; and
a plurality of battery modules that are captured between the end plates and between the bands, the plurality of modules containing a plurality of prismatic cells.

14. The battery pack of claim 13 wherein the outer enclosure includes a first enclosure and a second enclosure, the fasteners extending through the first enclosure and the second enclosure.

15. The battery pack of claim 13 wherein the fasteners include at least one of a screw and a nut, the second apertures are counterbores, and at least one of the nut and a head of the screw are disposed within the counterbores.

16. The battery pack of claim 13 wherein the inner frame includes a first frame, a second frame, and a center channel, the first frame capturing a first cassette of battery modules, the second frame capturing a second cassette of battery modules, the center channel extending through a center of the battery pack and connecting the first frame to the second frame.

17. A battery pack, comprising:
a plurality of battery modules containing a plurality of prismatic cells;
an inner frame capturing the plurality of battery modules, the inner frame including end plates and a plurality of bands extending between and connecting the end plates, the bands including a generally flat portion and an elongated ridge that is raised relative to the generally flat portion; and
an outer enclosure that encloses the plurality of battery modules and the inner frame.

18. The battery pack of claim 17 wherein the inner frame includes a first frame, a second frame, and a center channel, the first frame capturing a first cassette of battery modules, the second frame capturing a second cassette of battery modules, the center channel extending through a center of the battery pack and connecting the first frame to the second frame.

19. The battery pack of claim 18 wherein the center channel includes end members and a cross member extend between and connecting the end members.

20. The battery pack of claim 18 further comprising a power circuit that is mounted to the center channel.

* * * * *